United States Patent [19]

Richards et al.

[11] Patent Number: 5,381,751
[45] Date of Patent: Jan. 17, 1995

[54] TRANSPORTATION AND DISCHARGE OF WASTE TO ABYSSAL DEPTHS

[75] Inventors: William R. Richards, Springfield, Va.; John A. Wilkes, Crofton, Md.; Brian K. Schwatka, College Park, Md.; Andrew M. Resnick, Bethesda, Md.; Lawrence A. Mackey, Waldorf, Md.

[73] Assignee: Oceaneering Technologies, Inc., Upper Marlboro, Md.

[21] Appl. No.: 153,158

[22] Filed: Nov. 17, 1993

[51] Int. Cl.⁶ .............................................. B63B 35/00
[52] U.S. Cl. .................................................... 114/264
[58] Field of Search ......................... 114/26, 27, 28, 29, 114/30, 31, 32, 33, 34, 35, 36, 37, 38, 264, 265, 256, 258, 270, 267; 137/236.1; 405/154; 141/1

[56] References Cited

U.S. PATENT DOCUMENTS

| | | |
|---|---|---|
| 542,408 | 7/1900 | Delehanty . |
| 3,456,824 | 7/1969 | Smith . |
| 3,595,161 | 7/1971 | Webb . |
| 3,881,530 | 5/1975 | Faldi ................................ 114/27 |
| 4,307,679 | 12/1981 | Goldsberry et al. . |
| 4,357,764 | 11/1982 | Lemercier et al. . |
| 4,400,115 | 8/1983 | Biancale et al. . |
| 4,452,478 | 6/1984 | Dulaney . |
| 4,518,507 | 5/1985 | Conner . |
| 4,525,100 | 6/1985 | Zawadzki, Jr. et al. . |
| 4,829,923 | 5/1989 | Copson et al. ...................... 114/27 |
| 4,863,638 | 9/1989 | Harper, III . |
| 4,877,353 | 10/1989 | Wisotsky, Sr. . |
| 5,115,751 | 5/1992 | Copson . |

FOREIGN PATENT DOCUMENTS

| | | |
|---|---|---|
| 52-23872 | 2/1977 | Japan . |
| 62-141219 | 6/1987 | Japan . |
| 2004817 | 4/1979 | United Kingdom . |
| 2229145 | 9/1990 | United Kingdom . |

Primary Examiner—Stephen P. Avila
Attorney, Agent, or Firm—Fay, Sharpe, Beall, Fagan, Minnich & McKee

[57] ABSTRACT

A deep-ocean relocation system includes a transport vehicle (glider) and a quad riser assembly for transporting waste for disposal at abyssal depths. The transport vehicle is either self-powered or towed by a host vehicle, and travels at the water surface or underwater to the disposal site. At the disposal site, the transport vehicle, which is primarily constructed of a space-frame matrix that is positively buoyant in sea water, descends to abyssal depths along a helical glide path, discharges its waste cargo, and thereafter ascends. The quad riser assembly includes a floating platform and at least two riser lines extending from the platform down to abyssal depths. Waste is discharged through at least one of the riser lines to the abyssal depths, while at least one other riser line is used to draw water from the abyssal depths to generate a slurry with the waste material. The waste is thus thermally habituated prior to disposal. Both of these approaches provide cost effective and environmentally safe means for the depositing/relocation of large tonnages of waste, totally isolating the waste from the intervening water column, while generating low plume, and precisely emplacing the waste in abyssal sea floor regions possessing low biodiversity, low productivity and low kinetic energy. Further, such regions are amenable to long-term management/monitoring techniques.

24 Claims, 9 Drawing Sheets

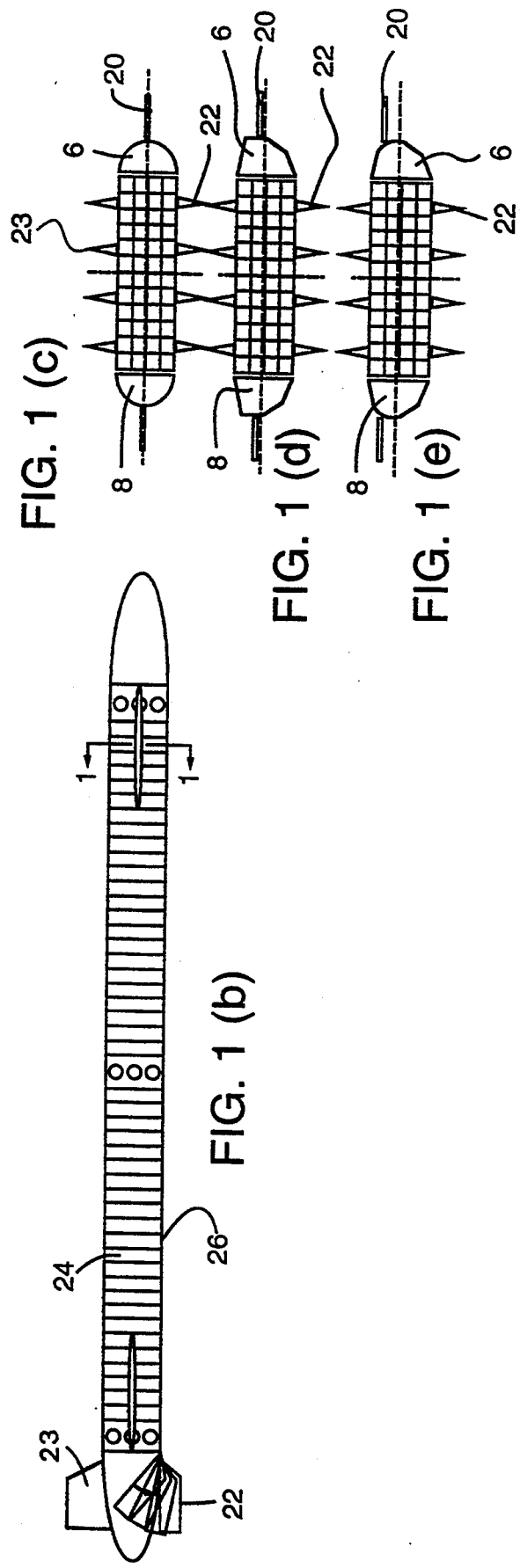
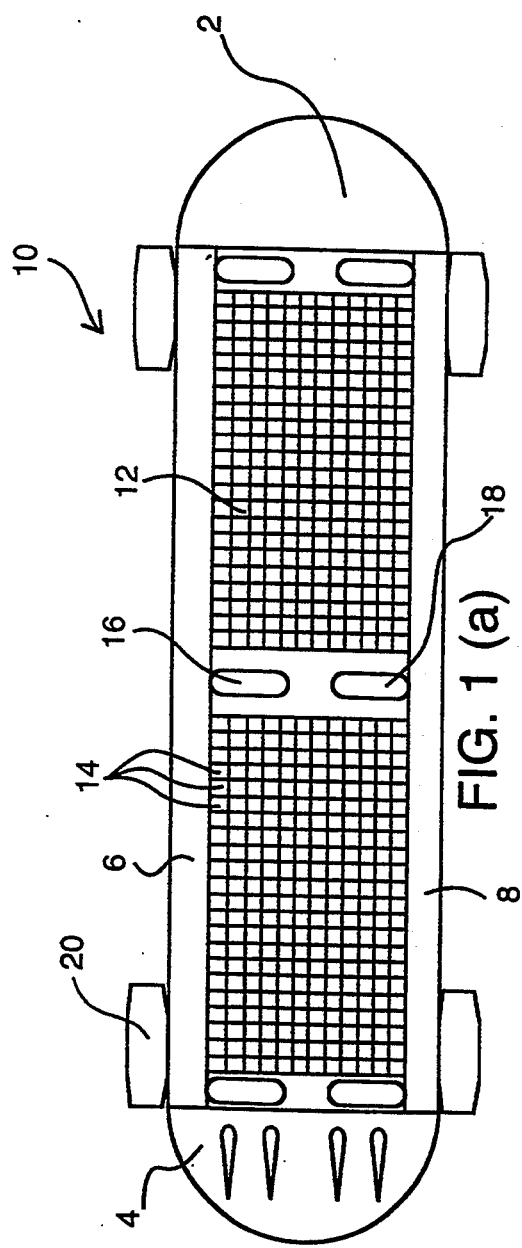

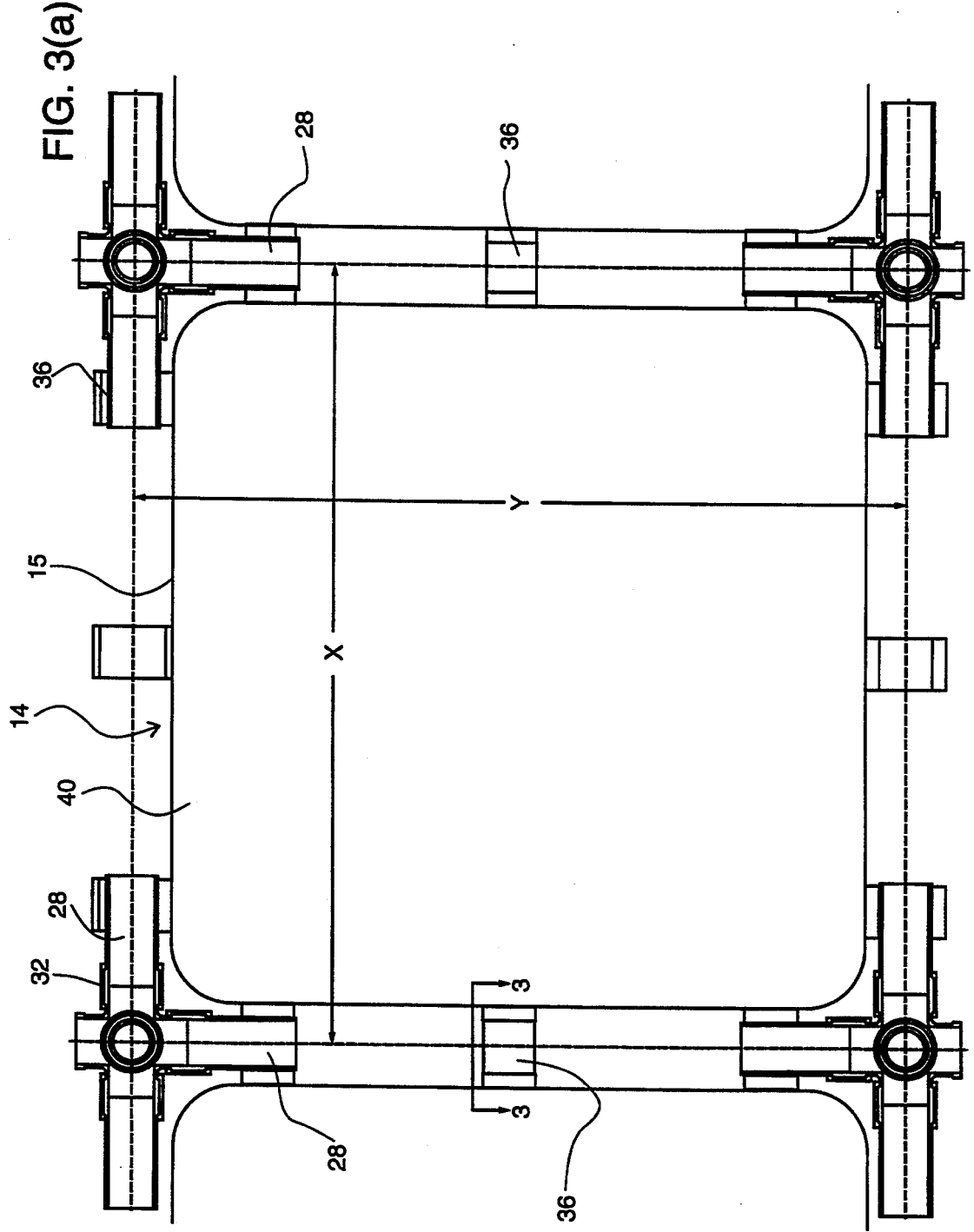

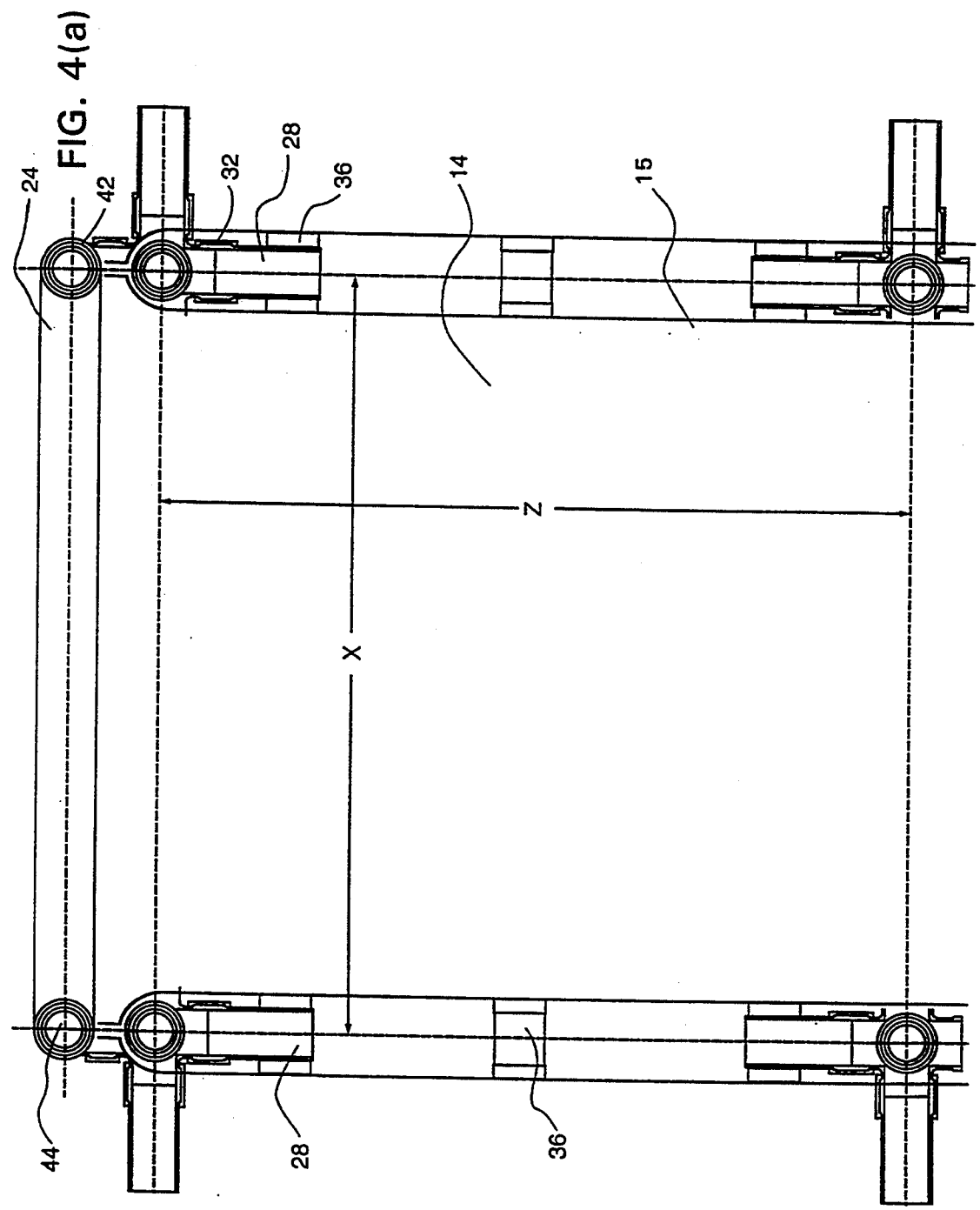

TRANSPORTATION AND DISCHARGE OF WASTE TO ABYSSAL DEPTHS

BACKGROUND OF THE INVENTION

1. Field of the Invention

The invention relates to transporting waste and discharging waste, such as municipal sludge waste, industrial waste, contaminated dredge sediment from coastal harbors, and other solid and liquid non-hazardous and hazardous waste, to abyssal ocean depths. In particular, the discharge of the waste at the abyssal depths takes place without contaminating the intervening water column at the discharge site.

Both of these approaches provide cost effective and environmentally safe means for the depositing/relocating of large tonnages of waste, totally isolating the waste from the intervening water column, while generating low plume, and permitting the precise emplacement of the waste in abyssal sea floor regions possessing low biodiversity, low productivity and low kinetic energy. Such regions are also amenable to long-term management/monitoring techniques.

2. Description of the Related Art

The need to dispose of waste of all kinds, such as toxic and radioactive as well as contaminated sludge, industrial waste and harbor contaminated sediments, has been met by various techniques. For example, solid waste from industrial and residential sources such as garbage, has primarily been disposed of by dumping in landfill sites and by incineration, with some recycling. Municipal waste from sludge processing facilities has also been disposed of by incineration and landfill, but the waste is often contaminated with toxins and heavy metals so that landfilling and incineration techniques are ecologically undesirable. With respect to landfill operations, toxins, pathogens and heavy metals from contaminated waste present a threat to the ground water and soil, and therefore landfill disposal of waste has recently been criticized for environmental reasons.

Attempts directed toward decreasing the pollution associated with the disposal of waste and dredge sediments have been focused on pre-treatment and post-treatment in the waste processing methods. For example, municipal waste is pre-treated to destroy pathogens and harmful bacteria, however, such processing can be expensive and is ineffective for reducing or eliminating heavy metals, for example. To reduce air pollution associated with incineration, smoke stack scrubbers are used, but such equipment is expensive to install and maintain. To protect ground water and soil contamination from landfill waste disposal, liners are being required for new and existing landfill sites in some areas. In other areas, in which the risk of ground water contamination is too great, proposed landfill sites are being rejected. Therefore, containing ground and soil contamination while still maintaining cost efficiency in the disposal method remain as problems for existing waste disposal operations, such as landfill and incineration.

Even if the threat posed to the environment can be reduced, the rate at which landfill sites are becoming filled to capacity is increasing. Recycling programs have been instituted to reduce the amount of solid waste that must be disposed of, but such programs merely slow the rate at which landfill sites are filled. With the increased sprawl of development outside major population centers, the availability of landfill sites is being reduced. Further, once a landfill has reached capacity, the land can be used for only limited purposes, especially if the landfill has been filled with contaminated waste. Therefore, the need for a viable alternative to landfill disposal of waste must be developed in order to satisfy the growing demand for environmentally safe and cost efficient waste disposal.

As an alternative to landfill and incineration methods, waste and dredge sediments have been disposed of by dumping them in the oceans and other large bodies of water. Commonly, this type of dumping involves off-loading the waste or sediments directly into the water from the surface and is referred to as top dumping. Top dumping is considered to be ecologically unsound since the dumping process and the resultant deposited waste or sediments pose a threat of contamination to the water. This contamination is sufficient to degrade marine life, and therefore such top dumping has already become unlawful in many countries, including the United States. Top dumping is currently permitted in only one EPA approved site, located in The Ferallons, approximately 40 nm (nautical miles) west of San Francisco. This site is being used for relocation of contaminated dredge sediments, at depths of approximately 10,000 feet.

It is well known in the geophysical scientific community, that there exists large abyssal sea floor regions which can be potentially used as desirable disposal sites. These sites, typically at depths greater than 11,500 feet, possess very low kinetic activity, productivity, and biodiversity. These "low-activity" zones on the ocean floor would be potentially ideal sites for the long-term isolation of large quantities of waste, in an environmentally safe manner. Additionally, they would be amenable to long-term management/monitoring techniques using prelocated instrument packages. These instrument packages would be emplaced by remotely operated deep ocean sea bed search/survey and recovery vehicles (ROVs), such as the CURV III. Suitable sites in proximity to the U.S., for example, are relatively close (<800 nm) to East, West and Gulf Coast ports.

It is now being considered whether it is desirable to dispose of waste on the ocean floor at abyssal depths as an alternative to landfill disposal. In order to dispose of waste at these depths in an environmentally protected manner, it is necessary to prevent contamination of the waste with the water that supports the marine life in the shallower water column above these sites. Studies have shown that the water at abyssal depths does not readily mix with the shallower water above it, i.e. thousands of feet above it, and therefore once such waste is disposed of in the ocean at abyssal depths, it does not pose a threat to contaminating the shallower water marine life at the disposal site.

Besides municipal and industrial waste, another source of contaminated waste that presents a significant disposal problem is sediment dredged from coastal harbors (dredge spoils) that have been contaminated by nearby industries and shipping. As the level of these sediments increases in the harbors and nearby waterways, they must be dredged in order to maintain open shipping channels for harbor operations. It is estimated that of the approximate 400 million cubic yards of sediment dredge spoils removed annually from coastal harbors in the U.S., approximately 5% of the sediment is contaminated and unsuitable for direct landfill application for disposal. Accordingly, proper treatment for disposal of this type of waste is required to prevent the contamination of ground water and soil just as it is with contaminated or toxic industrial and municipal waste.

Although it is convenient to relocate dredged sediment waste for disposal in the deep ocean, top dumping of contaminated dredge spoils in the form of a high solids content loose bulk is environmentally objectionable. The previously employed approach for top dumping of this loose bulk sediment in shallow waters (18-90 meters deep) has been studied by the Army Corp of Engineer over the past twenty years, and is well understood. The process of top dumping in shallow water can be briefly described as an initial phase of high speed convective descent, a second phase of dynamic collapse of the resultant mound (this occurs within one to two minutes), a third phase of initial recolinization/passive diffusion lasting 2-6 months, and a final phase of complete biological recovery of the dump site within 9-14 months. The plume cloud generated as a result of the dumping process is at an initial concentration of approximately 750 mg/m$^3$ and is shown to be completely settled/dissipated to concentration levels below 2-10 mg/m$^3$ within 20-40 minutes. The effective sea floor area of the resultant mound is approximately 20 times that of the initial watch circle area one might expect if a similar dumping operation were conducted on land. Top dumping of this loose bulk sediment in abyssal depth waters, however, leads to an entirely different situation, wherein the free-fall height of the sediments is by comparison 100 times greater. One would no longer know where the sediments would fall, due to dissipative/dispersion effects of varying currents existing at different ocean depths. Additionally the plume cloud might drift for hundreds of miles. Finally, the process of long-term management/monitoring of the dumpsite would be magnified manyfold in difficulty, with comparison to top dumping in shallow water, since the mound's watch circle would be from 10 to 100 times larger in size.

As a result, it has been proposed that a dredged slurry be pumped into tanks onboard a ship and then further pumped into disposable flexible (or rigid) containers positioned in chambers once the ship arrives at the dump site. Then, bottom doors of the chambers are opened and the containers are ejected. This method is disclosed in U.K. published Patent Application GB 2,229,145 to Eriksen. Specifically, as proposed, the slurry is first transported to the dump site in tanks capable of storing a fixed volume of the slurry and then it is pumped into smaller chambers that support the filling of the flexible (or rigid) containers. Therefore, the ship's total storage capacity is effectively reduced by the size of the chambers required for the filling of the containers. Furthermore, the transport and disposal method is inefficient since the containers must be filled on site, thereby increasing the overall transport time, and adversely affecting the economic viability of the operation.

The problem with the waste disposal method proposed by Eriksen is one of magnifying manyfold, the difficulty of effecting a long-term management/monitoring capability. Although the loose bulk is contained/isolated from the intervening water column by this method, its resultant high speed descent to the sea floor is in an unguided trajectory. This trajectory is essentially random in nature, due to the cross-current effects previously discussed. If alternative means are considered to hydrodynamically slow the containers' terminal velocities, the problem is magnified even further. This is due to the increased lateral displacements that would occur, and associated uncertainty, caused by the increased time to make the descent to the abyssal sea floor.

One of the primary considerations for developing a practical waste transport and disposal operation for disposing of waste at abyssal ocean depths is economic viability. The waste must be able to be transported in sufficient volume and be able to be disposed of quickly enough at the dump site so that the operating cost for disposal and the capital investment for equipment is kept to a minimum, as compared with conventional landfill operation expenses. Efficient handling of the waste in the loading and disposal phases of the operation is critical. If a ship or barge is used for transporting the waste to the dump site, then the capacity must be adequate since the length of the round trip to the disposal site, which is typically hundreds of miles offshore, expends the greatest amount of the operation time. If the capacity is insufficient, then the transportation cost and time is increased, or the capital investment is increased in order to provide greater shipping capacity so that the disposal of waste at abyssal depths is competitive with existing landfill operations.

SUMMARY OF THE INVENTION

It is an object of the invention to transport and dispose of waste of all kinds, whether contaminated with toxic or radioactive substances or not, at abyssal depths in the ocean without contaminating the shallow water supporting marine life above the abyssal disposal site in a cost effective, environmentally safe and reliable manner.

It is an object of the invention to transport waste to the ocean surface region above the abyssal disposal site by ship or barge, and in particular to transport the waste using a vehicle that is loaded with waste at a harbor or equivalent off-shore transfer station and propelled or towed to the ocean surface region above the abyssal disposal site. In particular, it is preferred that such a vehicle can be operated to travel from the ocean surface region above the abyssal disposal area to the abyssal depths for direct unloading in close proximity to the sea floor of the transported waste, either in bulk or in containers. After the disposal of the waste at the abyssal depths, the vehicle is preferably able to return to the surface of the ocean for reuse, wherein the vehicle is propelled under its own power or towed back to the harbor or transfer station. The vehicle can travel along the surface of the water or propelled or towed at depths below the surface of the water.

In order to ensure the controlled descent of the vehicle from the ocean surface (or shallow water just below the ocean surface, hereinafter referred to merely as the surface), the vehicle is preferably a glider that can be maneuvered to travel at a controlled rate of descent through the water from the surface to the abyssal disposal site. In particular, the vehicle can be controlled to move in a spiral or helical glide path through the water in order to ensure that the glider does not travel any great lateral distance from the ocean surface from which the glider begins its trip to where the glider finishes its trip, i.e. the point at which the glider disposes of the waste contained on board. The waste may be dumped at the abyssal disposal site at altitudes of from 50 to 250 ft. above the ocean floor.

Preferably, the glider is a seamersible remotely operated vehicle that has a command and control system that receives command data from a mother vessel and transmits data concerning its trip, i.e. position, attitude, discharge of waste, etc., to the mother ship so that monitoring and/or operation intervention of the vehicle's operation can be maintained at all times.

It is an object of the invention, according to another embodiment thereof, to provide a surface disposal platform that has piping extending from the surface of the ocean to abyssal depths that can receive discharged waste transported to the platform and convey the discharged waste to the abyssal depths through the piping. In particular, it is preferred that the piping be made of an even number of pipes each constructed in sectional units of predetermined length, wherein the sectional units are joined together at the platform as they are lowered into the water in order that a sufficient length of piping or risers can be connected together to travel upon the platform to the abyssal depths.

In a preferred construction of the riser assembly, each sectional unit has four pipes joined together and parallel with a platform formed to extend between the pipes at one end thereof. The platform is preferably able to support personnel in a position to perform the connection between sectional units as they are lowered into the water for connection in forming the pipe assembly.

The platform at the ocean's surface can be either a drilling rig type of platform with propulsion units for maintaining the platform in a geographically stable position, for example by use of a global positioning system, a semisubmersible platform or a ship having a moon pool that is maintained in position by the ship's propulsion system.

Once a number of sectional units have been joined together and a sufficient length of piping deployed from the platform (or ship, but hereinafter referred to simply as a platform), the waste can be transported from a harbor or offshore transfer station to the platform and conveyed into the riser assembly for conveying the waste to the abyssal depths through the piping. In this way, the water column in the ocean above the abyssal disposal site is completely isolated from contamination by the waste as it passes therethrough.

According to the invention, the diameter of the risers, the piping wall thickness, and the material of their construction is sufficient to withstand the stresses generated by extending from an ocean's surface to abyssal depths. Furthermore, the diameter of the risers is preferably sufficient to enable a large volume of waste per unit time to be disposed of through the riser assembly, and at low discharge velocity. Therefore, the disposal operation of transferring the waste from the ship or barge enables cost efficient rapid transfer handling of the waste and minimize the dwell time on-site.

BRIEF DESCRIPTION OF THE DRAWINGS

FIGS. 1(a)–1(e) schematically illustrate plan, elevation and end views of a deep-ocean relocation transport vehicle, or glider, constructed according to the teachings of the present invention.

FIG. 3(a) illustrates a storage cell of the space-frame matrix.

FIG. 4(a) illustrates a trap door embodiment for the space-frame matrix.

DETAILED DESCRIPTION OF THE PREFERRED EMBODIMENTS

Figure 2:
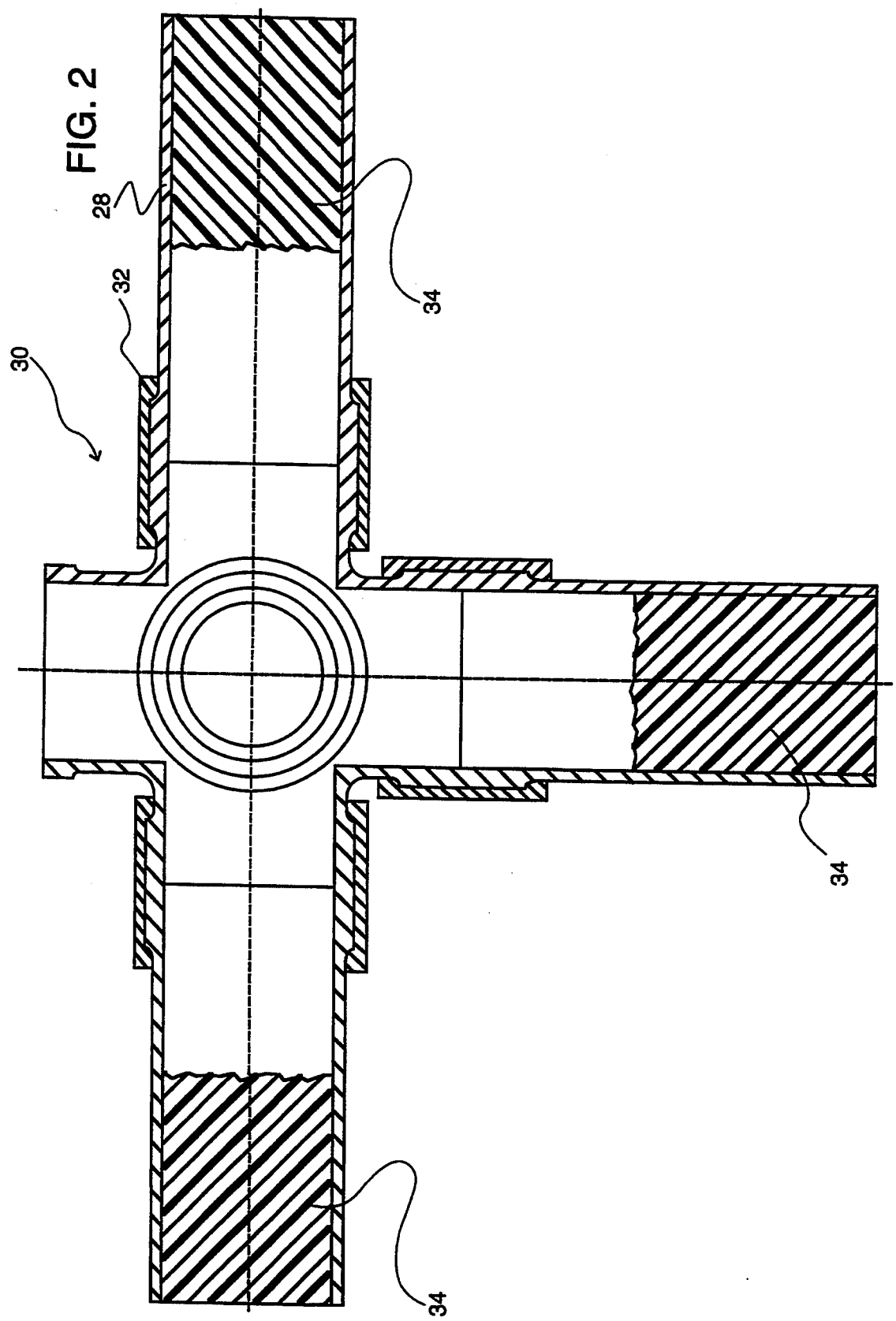
FIG. 2 illustrates details of a space-frame matrix construction.

According to a first embodiment of the present invention, waste is transported from a port or harbor to a deep-ocean dump site with a deep-ocean relocation (DOR) transport vehicle (glider) 10. For purposes of illustration, the required seamersible vehicle geometry for a nominal 50,000 ton bulk cargo capacity would be approximately 560 ft. long, by 160 ft. beam, by 40 ft. depth. FIGS. 1(a)–1(b) schematically illustrate plan and elevation views of the DOR transport vehicle 10 constructed according to the teachings of the present invention. The elevation view is shown in cross-section, taken along line 2—2 in FIG. 1(a). FIGS. 1(c)–1(e) show alternative end view sections of the vehicle taken along line 1—1 of FIG. 1(b).

Referring to FIG. 1(a), the DOR transport vehicle 10 includes forward and aft prolate spheroidal hydrodynamic fairings 2, 4, which are preferably constructed of materials having a density of less than 0.1 lbs/in$^3$, such as aluminum or fiberglass, and which incorporate syntactic foam to render each of the fairings neutrally buoyant. The fairings contribute to the vehicle producing less than 100,000 pounds net towline drag resistance at 7.5 knots, requiring a net towing power of approximately 2000 hp, in accordance with the optimization of other features of the vehicle. The forward fairing preferably also incorporates spaces for integration of onboard guidance and command/control systems, including power supplies, tether management means and sensors for interlock/monitoring subsystems, all contained in pressure-resistant housings. The aft fairing preferably incorporates features for interfacing with the rudders, including openings that permit retraction of the rudders into the aft fairing so that vehicle draft in shallow waters is minimized. Although the fairings are illustrated in FIG. 1(a) to be semicircular and indentical in shape, this is merely for purposes of illustration. It is understood that the forward fairing would have a blunt ellipsoidal and the aft fairing would have a sharp ellipsoidal shape with a major axis of curvature of up to approximately twice that of the forward fairing.

The DOR transport vehicle 10 further includes port and starboard main ballast tanks 6, 8, which are preferably constructed of materials similar to the materials forming the forward and aft fairings 2, 4. The ballast tanks may each comprise a plurality of watertight bulkheads arrayed longitudinally, with the venting and flooding of each tank being controlled by the command/control system. Vehicle trim, including both pitch and roll attitude, can further be maintained within desired margins by use of trim tanks located both forward and aft, and port and starboard.

A space-frame matrix 12 comprises the main structural element of the DOR transport vehicle 10, providing for the stationary transport of waste in a plurality of storage cells 14, optionally including a like plurality of bulk storage containers (not shown) within the cells 14 to hold the waste. Note that, as shown in FIGS. 1(c)-(e), storage cells 14 may be three-dimensionally disposed (i.e., stacked vertically as well as being disposed horizontally). In a preferred embodiment, space-frame matrix 12 includes a plurality of upper and lower trap doors at 24, 26, but not explicitly shown, associated with each of the storage locations, for the filling and release of the cargo contained in the storage cells 14. The space-frame matrix 12 is preferably constructed so that a minimum displacement of sea water results (i.e., so that the transport vehicle has a maximum amount of positive buoyancy). The frame provides for a maximum unit cell dimension while maintaining a high structural mass moment of inertia with low induced stress due to operation of the transport vehicle. Of these features, maintaining a maximum amount of positive buoyancy is of considerable importance because the speed at which the DOR transport vehicle 12 will return to the water surface at the completion of a disposal operation, described more fully below, is directly proportional to its residual positive buoyancy.

Port and starboard trim tanks 16, 18, located both forward and aft, are provided to enable trim adjustments to effect changes to pitch and roll attitude of the DOR transport vehicle 10 during decent and ascent from and to abyssal depths, in a preferred embodiment. Using the command/control system, trim adjustment is accomplished by transfer of sea water from one trim tank to another, for example. This enables trim adjustment using minimal pumping horsepower for "long-term" adjustments. Control surfaces may be employed for "short-term" attitude adjustments.

For example, short-term attitude adjustments can be made using stabilizers 20, also shown in FIG. 1(a). Stabilizers 20 can be actuated from a centerline shaft, for example, thus requiring minimum actuation torque for positioning the stabilizers to the desired angle of attack. Both aiding and restoring torque balance can be achieved independently of the position of the individual stabilizer. In this regard, positioning is preferably accomplished via a "sliding-mode" feedback control action, wherein a dynamic vehicle response is achieved regardless of vehicle attitude or mass properties, and each stabilizer can thus be positioned to realize any desired lift/drag component.

Rudders 22 are employed to change the vehicle yaw attitude. Actuation of these control surfaces is similar to that of stabilizers 20 to minimize the actuation forces required. Additionally, the preferred configuration provides for retraction of rudders 22, as mentioned above, so that the vehicle draft may be minimized. Further, rudders 22 are preferably slaved via hard mechanical linkages, not shown, such that each rudder achieves the same relative angle of attack, as commanded by the "sliding-mode" control action position setpoint desired. The number of slaved rudders may be from one to four, for example, contingent upon the desired magnitude of yaw-inducing force required to effect vehicle heading changes, versus the total effective surface area of the rudders. Vertical stabilizers, 23, are employed to provide enhanced vehicle roll stability.

FIG. 1(b) schematically illustrates the location of upper and lower trap doors 24, 26, which are associated with individual storage cells 14 of the space-frame matrix 12. Preferably, control of the trap doors is linked so that each row, running parallel to the vehicle longitudinal centerline, are caused to sequentially pivot open such that minimum projected area of the trap doors is exposed to hydrodynamic drag forces. Actuation of these longitudinal rows of upper and lower trap doors is preferably accomplished in concert, and in a predetermined sequence, commencing from the innermost set of rows on either side of the vehicle longitudinal centerline and proceeding outwardly to the last set of rows located along the port and starboard sides respectively. In this manner, vehicle trim will be least affected by the change in mass resulting from disposal of the bulk cargo on or near the abyssal sea floor via the opened lower trap doors 26.

Turning to FIG. 2, a preferred chordal member 28 of the space-frame matrix 12 structure is shown. To permit utilization of rapid assembly techniques and to eliminate or at least minimize the need for welding and mechanical fasteners, fixed-length chordal members 28 crisscross at vertex assemblies 30 via a Marmon clamp 32. Chordal members 28, vertex assemblies 30 and Marmon clamps 32 preferably comprise a common structural material to minimize galvanic action. Marmon clamps are preferred because they achieve full tube wall strength without the use of welding by effecting a uniform compressive stress on the adjacent butt-end faces of the chordal member and the respective vertex attachment point, and at the same time serve to both orient and align the features of these two elements. Chordal members 28 are also preferably filled with syntactic foam 34 similar to Hysin 55 (TM), prior to final assembly into the space-frame matrix 12. The syntactic foam 34 may be cast in-place to occupy the entire interior volume of the finished chordal member 28.

The space-frame matrix 12 thus constructed provides a greater than 2.5 factor of safety to allowable stress versus induced pitch, yaw and roll moments of $2.64 \times 10^7$, $2.91 \times 10^7$ and $3.40 \times 10^6$ ft. lbs., respectively, and a greater than 9.0 safety factor to Euler buckling (chord members L/D @<14:1).

Figure 3B:
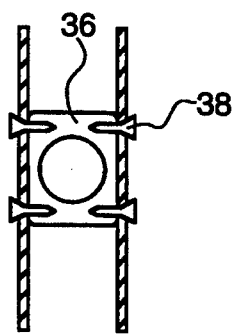
FIG. 3(b) shows a securement of a container wall of a storage cell to the space-frame matrix.

FIG. 3(a) illustrates a single storage cell 14 in a preferred embodiment of the present invention. Storage cell 14 includes a wall 15 formed of a material having a specific gravity approximating that of sea water, and is similar to the HDPE material utilized in Driscopipe TM. The container wall 15 may comprise a plurality of individual flat and/or curve sections, or a monolithic structure as shown in the drawing. The wall 15 is preferably rigidly mounted to the chordal members 28 defining the storage cell 14 by sleeves 36 and associated fasteners 38, discussed in more detail below in connection with FIG. 3(b). The free-floodable container may have interior dimensions of 120 in. × 120 in., with a height of approximately 40 feet. The container walls thus formed to provide adequate taper, preferable from 0.25 to 0.50 degrees, to permit unimpeded release of the bulk cargo contained therein. The free-floodable container is preferably rigidly mounted to the associated chordal members using sleeves 36 and fasteners 38, as described below.

In addition to the wall 15, a disposable low friction liner 40 is preferably included within the confines of each storage cell 14, into which the waste is loaded. The liner 40 is fabricated from a highly flexible or elastic material, for example, which is capable of being inflated to conform to the interior features of the wall 15 such that the disposable liner 40 can be sealed or closed when filled with the waste. Thus, sea water does not contact the waste during transport and descent to the abyssal sea floor disposal site. The flexible liner effects capability to permit complete storage cell 14 free-flooding, and consequent pressure compensation of the waste contained therein. In a preferred embodiment, liners 40 are biodegradable, and may be designed to rupture upon impact with the ocean floor, preferably at a terminal velocity less than 10 to 20 feet/sec.

Sleeves 36 are preferably fabricated from material similar to that of the chordal members 28, and are aligned and installed with the chordal members 28 prior to final assembly of the chordal members 28 in the space-frame matrix 12. The sleeves 36 may be shrink-fit onto the chordal members 28, for example, and positioned at desired intervals prior to completing the final assembly.

As shown in greater detail in FIG. 3(b), which is a cross-section taken along line 3—3 in FIG. 3(a), sleeves 36 are fastened to the chordal members 28 by CRES fasteners 38, in a preferred embodiment. ACRES fastener has the illustrated tapered features for engaging a sleeve 36 through the wall 15 of the storage cell 14. The fasteners 38 and sleeves 36 can be employed at any number of desired locations (three per cell, in the illustrated embodiment) along each side of a storage cell 14, with two fasteners preferably being utilized for each sleeve.

Figure 4B:
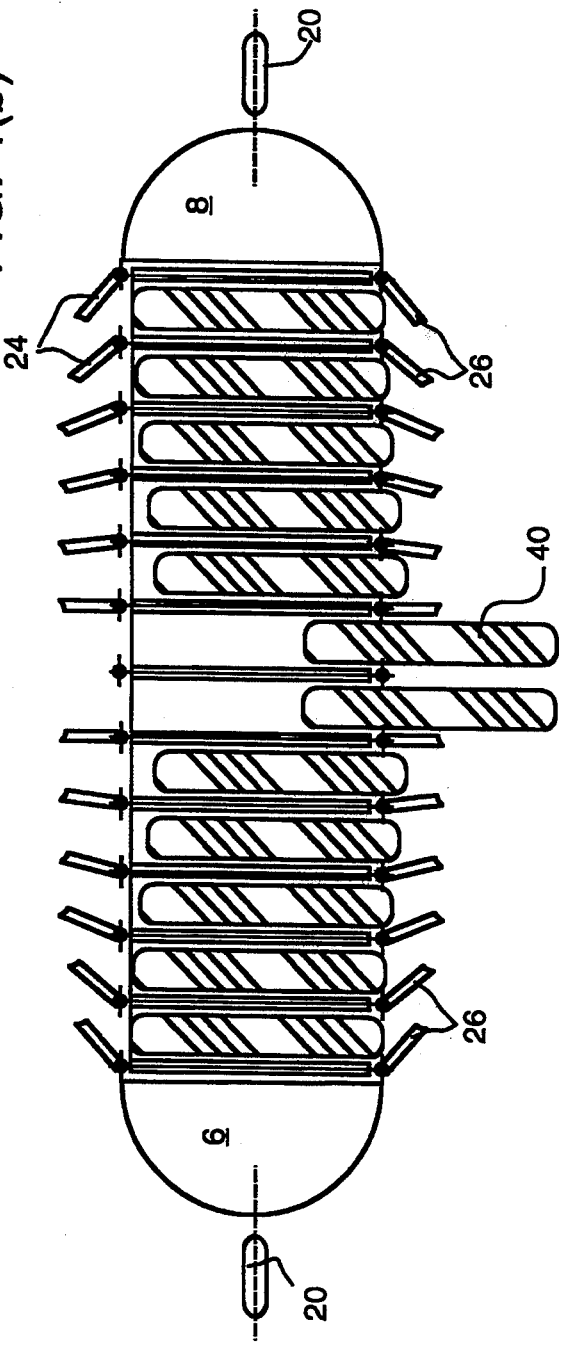
FIG. 4(b) illustrates the sequential opening of upper and lower trap doors for dumping waste.

Turning to FIGS. 4(a) and 4(b), the mounting arrangement for storage cell walls and the upper and lower trap doors is shown. The storage cell walls 15 are dimensioned to fit within the storage cell area formed by the space frame matrix. Also, each wall preferably has an upper area 17 that is seated at the top of the cell to be supported by the frame. Reference numeral 42 in FIG. 4(a) designates an adapter post, to which a chordal member 28 and/or an upper trap door 24 may be mounted, as shown. Rotary joint 44 is shown associated with a particular adapter post 42 and form the hinge joint for the trap door. The structure for the upper and lower trap doors is preferably the same.

Figure 4C:
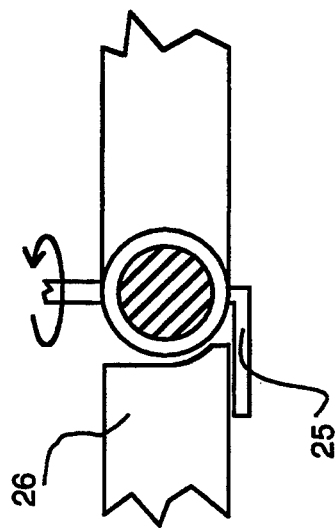
FIG. 4(c) discloses an embodiment of a lock device for the lower trap doors.

As shown in FIG. 4(c) the lower trap doors are preferably locked in the closed position by a mechanical locking device, such as arm 25. Once the lock for a lower trap door is open, the trap door would freely swing open, although a shock absorbing member may be incorporated.

Upper trap door 24 may be fabricated from a material having a specific gravity less than that of sea water. Preferably, upper trap door 24 has a honeycomb construction, and is filled with a syntactic foam of, for example, density less than 0.036 lbs/in$^3$, to withstand a uniform compressive load of 15 to 20 psi. Both the upper trap doors 24 and lower trap doors 26 (which are constructed of a similar material) should be configured to expose a minimum projected area to the vehicle hydrodynamic freestream when open, in order to minimize the actuation forces. Also, the storage cell walls are preferably tapered outwardly with respect to their depth to permit the free fall of the liners from the storage cells once the trap doors are opened.

A DOR transport vehicle 10 constructed as described above can relocate contaminated or uncontaminated sediments or other waste materials originating from a distant site directly to the abyssal relocation site of the ocean floor, or slightly above the ocean floor. In the example of relocating dredged sediments from a coastal water region to an abyssal site, the DOR transport vehicle 10 can be driven or towed above water or underwater. However, upon reaching the discharge site, the DOR transport vehicle 10 travels to the ocean floor in a spiral or helical fashion, with helical radius of approximately 6×the vehicle length, at speeds of 5 to 18 feet per second vertical terminal velocity, flood negative, at a 30-degree angle of attack. Upon reaching the abyssal site, whether at the ocean floor or at a predetermined distance above the ocean floor, the lower trap doors 26 are opened as described above, and the waste, with liner 40, is deposited on the ocean floor. Then, the DOR transport vehicle 10 returns to the water surface in a similar spiral or helical glide path at less than 5 feet per second, due to the vehicle now being positively buoyant with release of its cargo.

Constructed as described above, the DOR transport vehicle 10 is capable of transporting as much as 50,000 to 100,000 tons of waste to a disposal site, and of discharging the waste at a rate greater than 50,000 tons in under one minute and preferably in less than 10 seconds. The fully-loaded vehicle has a bulk cargo specific gravity less than 1.3, the bulk cargo capacity representing approximately 85% of the vehicle's displaced weight in sea water.

Figure 7A:
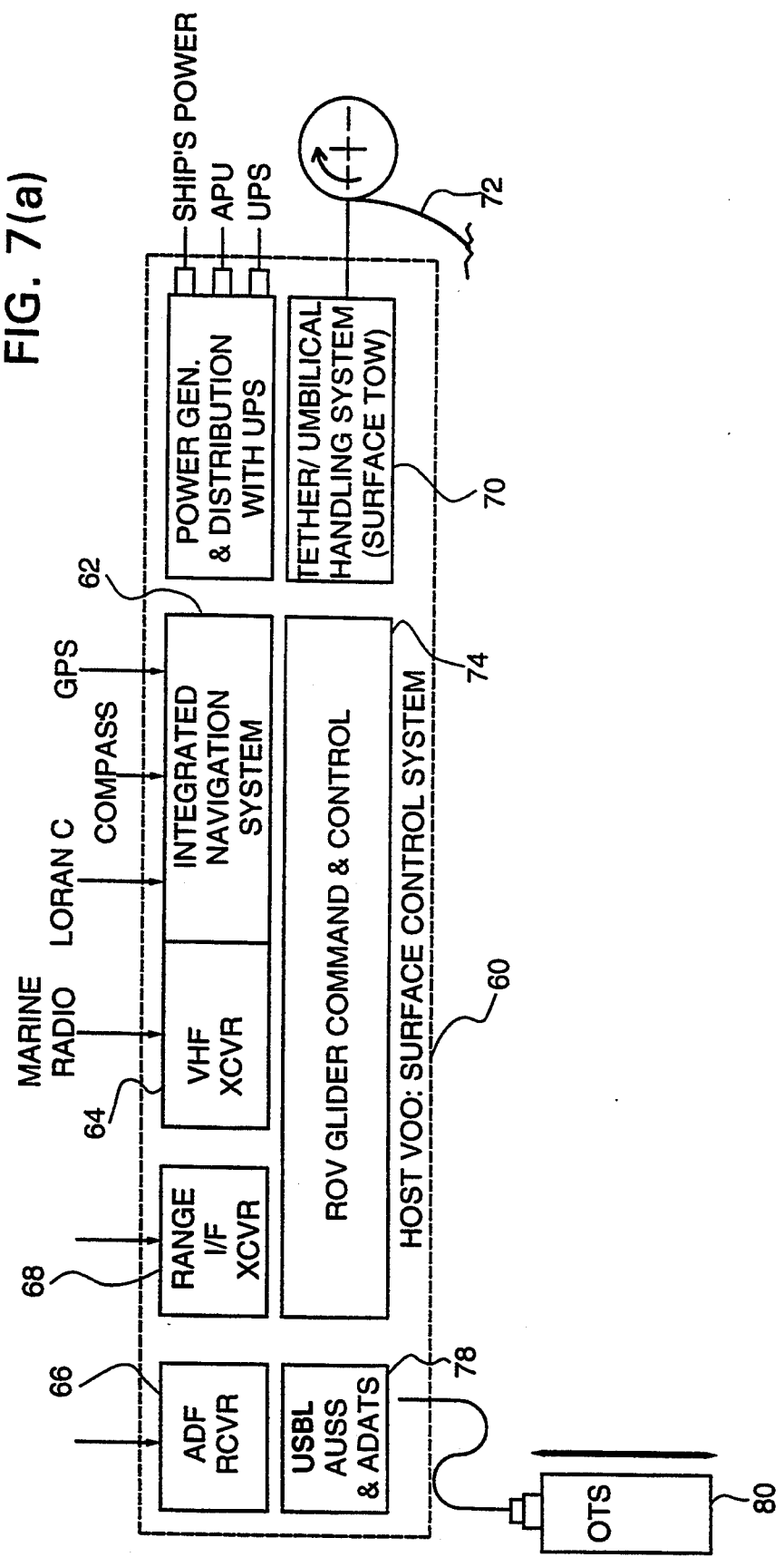
FIG. 7(a) is a schematic diagram of the command and control system components that are part of the glider command and control system located in the host vehicle.
Figure 7:
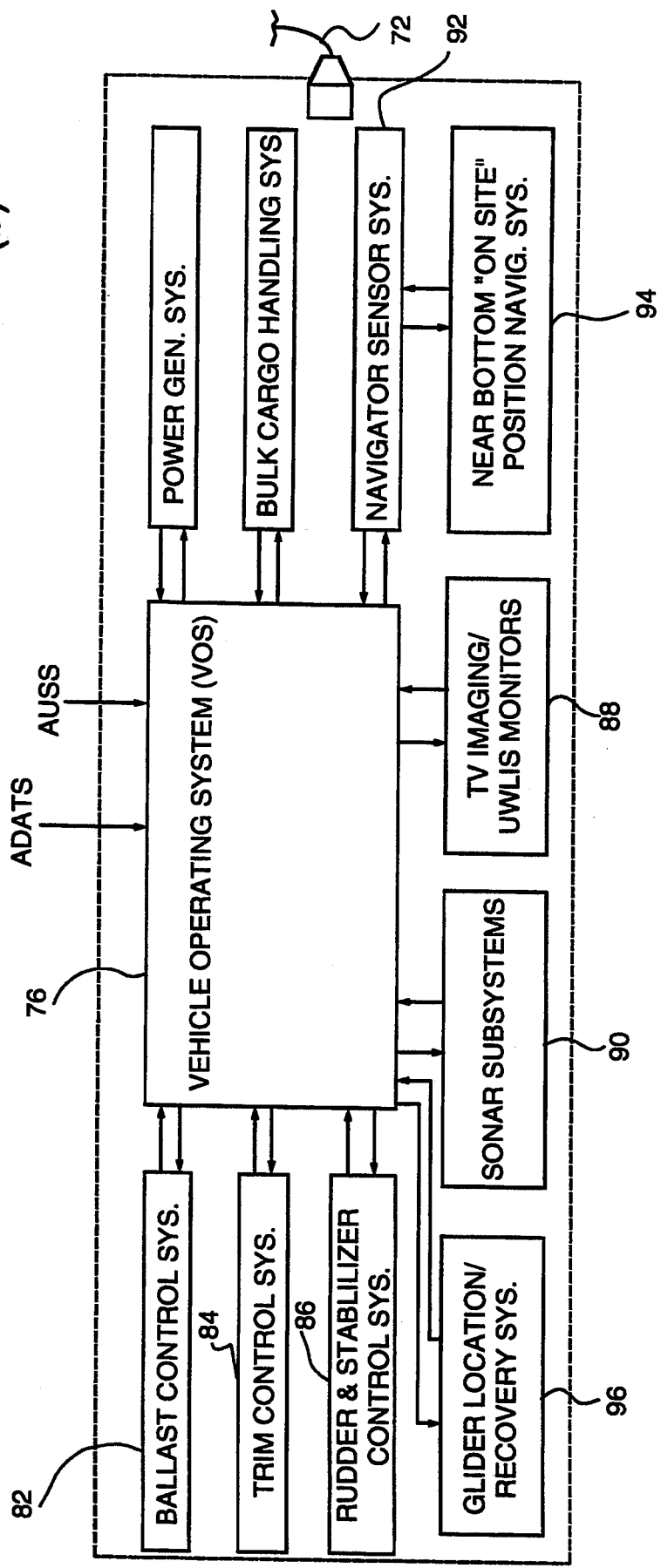
FIG. 7(b) is a schematic block diagram of the command and control components of the command and control system for the glider located on board the glider vessel.

FIGS. 7(a) and 7(b) show one embodiment of a command and control system for the glider (DOR transport vehicle) 10. The system components on board the host vehicle (not shown) are shown in FIG. 7(a) and the system components for the glider are shown in FIG. 7(b).

On board the host Vehicle-Of-Opportunity (VOO) is the surface control system, 60. The system, 60, is powered with an uninterruptable power source (UPS) from the ship's power or from an auxiliary power unit (APU). For navigation and communication, the surface control system has navigational aids, such as Loran C and a global positioning system (GPS), as well as a compass that input data to an integrated navigation system 62. Communication with land-based stations or other marine vehicles via marine radio is enabled by a VHF receiver/transmitter 64, for example. Additional navigational aids, such as an ADF (automatic direction finding) receiver 66 and a range I/F 68 receiver transmitter are provided, as well.

The function of the host vehicle is to tow the glider 10 unless the glider is self-powered. Preferably, the glider is, in one embodiment, towed beneath the surface at a depth of approximately 300 ft. by a tether that can be paid out and reeled up under control of the tether-/umbilical handling system 70 with integral motion compensation. Preferably, the tether 72 provides a multiplexed communication link, such as by coax or fiber optic cable, between the host vehicle and the glider 10. For example, a synthetic rope having a composite multiconductor, coax or fiber optic and strength member construction with a breaking strength of greater that 500,000 pounds, and length of approximately 2,000 ft. would be suitable for towing the glider.

The glider command and control system 74 coordinates host vehicle and glider positioning during towing operations and commands when the glider tether should be released for glider descent and disposal of the waste at the abyssal site. The autonomous glider onboard command and control system (VOS) 76, shown in FIG. 67(a) can be a computer, for example, that is preferably acoustically linked to the host VOO surface control system using deployable OTS (over-the-side) buoy 80, shown in FIG. 7(a). In a preferred embodiment, the glider command and control system both monitors and permits operator intervention during descent and ascent of the glider vehicle. Therefore, a USBL (ultra-short base line) acoustic tracking, AUSS (advanced unmanned search system acoustic telemetry) and ADATS (adjustable diversity acoustic telemetry system) 78 is provided as part of the surface control system to provide the necessary acoustic data link capability communication.

As shown in FIG. 7(a), a sonic buoy 80 is tethered to the USBL tracker system, and it is preferred that the buoy be lowered to maintain relatively close proximity to the glider helical guide path as it descends, i.e. within about 200 meters, such that high data rate (bits/sec.) and low time acoustic path delays are realized.

once the glider command and control system 74 has determined that the disposal site has been reached, a command is issued to begin descent of the glider 10. The vehicle operating system 76 for the glider, shown in FIG. 7(b), is linked to the ballast control, trim control and rudder and stabilizer control systems 82, 84 and 86, respectively, for beginning the descent of the vehicle. Control of the glider's descent is monitored by the glider command and control system 74 through the vehicle operating system 76. Preferably, the vehicle operating system has a six DOF linear vehicle model for hydrodynamic performance prediction and sliding mode control (SMC) parameters updating, guide trajectory attitude and position updating, as well as navigation and guidance capability on an autonomous basis. If desired, a flight recorder type of device can be included with the vehicle operating system.

Sonar subsystems, 90, are provided to aid in the operator monitoring of the vehicle progress during the descent, release of the cargo and re-ascent phase of operation. The sonar subsystems preferably include OAS (obstacle avoidance sonar), dopplar and sidescan sonar capability.

Additionally, as the vehicle approaches the disposal site located on the abyssal sea floor, TV imaging and/or UWLIS (underwater laser imaging system) 88 monitoring by the operator can be realized, for providing visual aid in determining vehicle progress "on-site".

As the glider 10 approaches the sea floor, the decision about opening the bulk cargo handling system, such as the trap doors 24, 26 for the containers, to dispose of the waste is made. Part of the determination is made using the navigation sensor system 92, which includes a near bottom "on site" position navigation system 94 for release attitude and transitional maneuvering. It is important to achieve the desired release attitude before the bulk cargo handling system begins opening the trap doors for unloading the cargo.

As the glider 10 descends to the disposal site, the vehicle's movement is carefully monitored. The disposal site is preferably pre-surveyed and navigational beacons placed in strategic locations to provide the proper feedback to the navigation sensor system 92 for making the determination by the vehicle operating system 76 of when to discharge the load.

The glider 10 may be controlled by the vehicle operating system 76 by controlling the pitch of the vehicle to pitch down when beginning descent and to pitch up for braking. The ballast control system 82, trim control system 84, and rubber stabilizer control system 86 are sufficient to maintain the desired speed and path of travel, which is a helical shape as aforementioned.

After the glider has released its cargo, the glider enters the recovery mode. The positive buoyancy of the space-frame matrix 12 ensures that the glider will return to the surface. The glider recovery system permits monitoring the location with respect to that of the host VOO of the glider, which includes, for example, a location beacon or pop-up mast automatic direction finding (ADF) system so that the host vehicle can easily locate the glider once it has surfaced. When the host vehicle has located the glider after surfacing, the glider recovery system 96 also assists in the tether docking, including the take up of the tether/umbilical cable to restore surface towing conditions or partially submerged towing conditions, whichever are desired.

Figure 6:
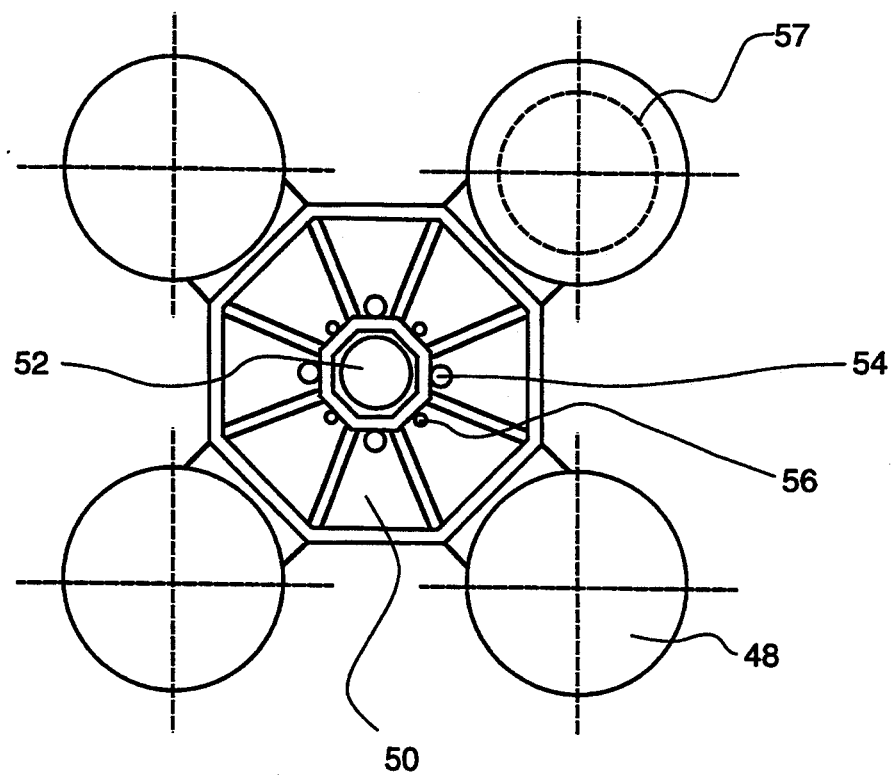
FIG. 6 shows a plan view of the quad riser assembly.

In a second embodiment of the invention for deep-ocean relocation, a DOR quad riser assembly 46 as illustrated in FIG. 6 is constructed and employed. As shown in FIG. 6, a modular assembly is preferred for constructing the DOR quad riser, each module of the assembly being approximately 50 feet in height, for example.

In each DOR quad riser assembly 46, four riser lines 48 are illustratively joined by a platform or spacer 50. The riser lines 48 preferably have a diameter of 54 inches, although other sizes may be used as the conditions require. The large diameter enables large throughput of waste, but also permits alternative disposal methodologies, such as by using containerized packages 57 rather than a free slurry.

These containerized packages 57 permit the adaptation of the DOR quad riser assembly to effecting the disposal of other types of waste products such as toxic, low level and high level radioactive waste in an environmentally safe manner. These packages provide the required level of very long term structural integrity to assure permanent isolation of the products contained therein. Additionally, they are sized to realize close annular clearance to that of the riser lines 48. By maintaining this close annular clearance, large hydrodynamic drag forces may be induced on the heavy container, to realize a very low terminal velocity descent of the container to the abyssal sea floor disposal site. The containers may therefore be safely deposited on the sea floor at low velocity, thereby assuring their structural integrity.

Riser lines 48 may comprise HDPE Series 1000, SDR=26, although selection of the preferred material for the riser lines is based principally upon the desirable characteristic of being positively buoyant in sea water, and resistance to sustained hydrostatic pressures from 5000 to 8800 psi. Thus, syntactic foam is not required for the riser elements, as has been used in the prior art.

Additionally, selection of the largest commercially available size, including realizable wall thickness, provides maximum bending stiffness. This is especially important when considering the length of the riser required to reach abyssal depths, versus the induced lateral displacements that would result due to cross-currents that exist at various depths of the water column.

Further, the desirable properties of the HDPE material vis-à-vis its bulk compressibility/capability for surviving hydrostatic pressures existing at abyssal depths provides the requisite structural integrity under partial wall collapse (less than 10%) to assure that the modular sections located at abyssal depths do not fail under extended use.

As mentioned, the preferred embodiment includes four riser lines 48. By this construction, two riser lines may be used for pumping or otherwise conducting a slurry mixture of material to be deposited, 20 to 30% by weight, and the other two for raising sea water to generate the slurry either on the platform, in an adjacent vessel, or in some other suitable manner. Rather than using four riser lines 48, however, two would be sufficient, with one being used for pumping the slurry mixture, and the other for raising sea water. The slurry mixture may be as high as 60-80% by weight, depending upon its viscosity, the dimensions of the riser lines 48, the mode of transport utilized, etc. Preferably, the sea water is raised from abyssal depths so that the slurry can be thermally habituated prior to emplacement, thus minimizing any thermal convective currents being generated by the deposit at or above the ocean floor. Additionally, by employment of slurry water from abyssal depths, very low in biological activity, the transmission of food products to the disposal site is minimized. This assures that the disposal site "status-quo" with respect to food chain opportunity/biodiversity is kept to very low levels.

In addition to providing a greater throughput (for example, at 7500 tons/hour for a pair of "down" riser lines), the redundancy (four riser lines 48) also provides the quad riser assembly with sufficient capacity for more than one bulk transport vehicle to be unloaded, as conditions permit. Additionally, redundancy enables a cover material to be deposited over a contaminated waste deposit by using the second set of riser lines 48.

Illustrated in the center of platform 50 is a monitoring/control pipe 52, preferably fabricated from the same or similar material as riser lines 48. Monitoring/control pipe 52 may be of a smaller size (for example, 24 to 36 inches in diameter) and employed as a conduit for the passage of remote inspection vehicles, and/or may also be used to take samples of the deposit site, including the resident sea water.

Flushing conduits 54 are provided, preferably symmetrically, about the platform and down along the riser lines 48, to provide flushing jet water to each of the riser lines 48 at regular intervals. In conjunction with the flushing conduits 54, means, not shown, are provided for connecting flushing conduits 54 to riser lines 48 at appropriate locations.

Instrumentation, power and sensor cables are provided at 56, and extend from the platform 50 down to the location at which power and/or monitoring is required. These cables, for example, may be provided to power and control lower terminus thrusters located along the length of the DOR quad riser assembly 46 for control of the waste discharge coordinates at the abyssal site relative to the coordinates of the platform 46, powering lights, sonar/positioning reference systems, instrumentation for the monitoring of benthos impact, site chemistry and deposit physical characteristics of footprint and plume. Interdependent monitoring modules may also be deployed throughout the water column along the length of the DOR quad riser assembly 46, etc.

The platform 50 is illustrated as being octagonal. However, the platform 50 may take any geometric construction such that the desired spacing distance between and among riser lines 48 can be realized. The construction should take into account the requirements not only for unloading a transport vehicle of the capacity outlined above with respect to DOR transport vehicle 10, but also for building the DOR quad riser assembly 46 at the relocation site, including assembling the modules at the water surface and then lowering them one-by-one.

Thus, platform 50 acts as a working platform for riggers during the assembly/modular subassembly connection process, such that free access is provided to all areas. Platform 50 is best configured and positioned to conform to the clearance space platform projection of the DOR transport vehicle 10 "moon pool" or "drill string" such that a continuous deck or walking surface is available for the riggers.

Figure 5:
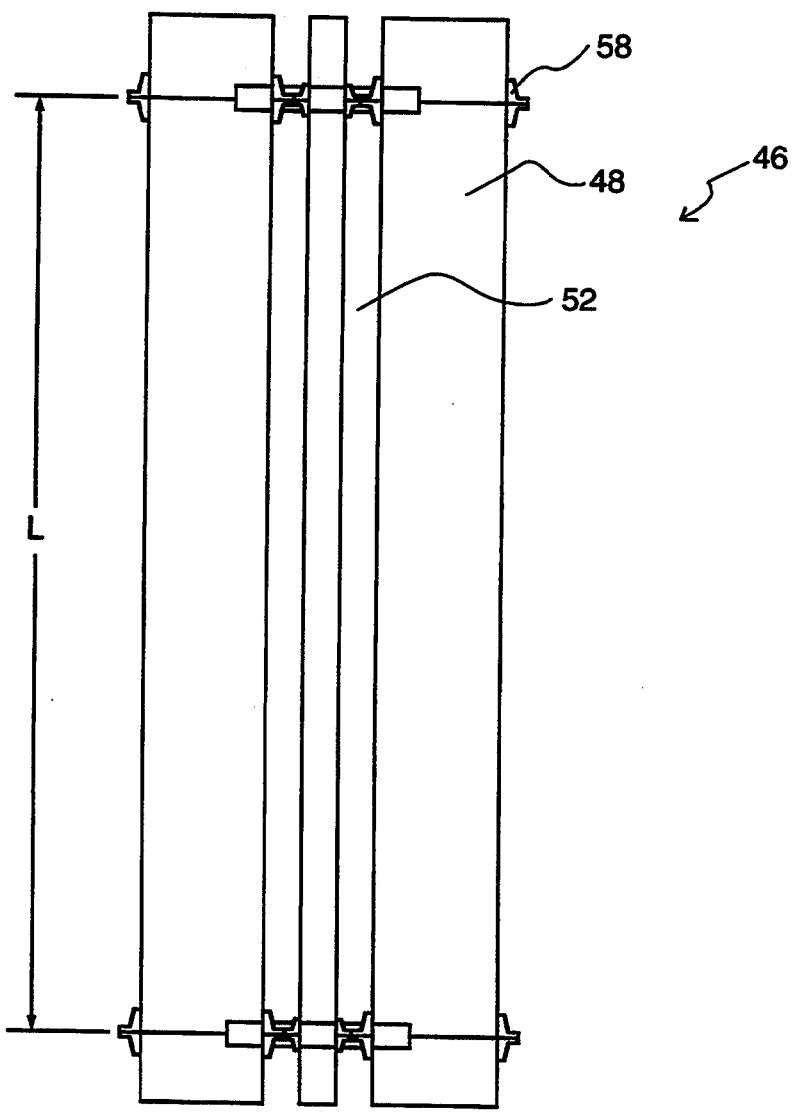
FIG. 5 schematically shows a deep-ocean relocation quad riser assembly constructed according to the teachings of the present invention.

Riser lines 48 and monitoring/control pipe 52 "as-manufactured" lengths are connected together in modular form, as depicted in FIG. 5. The connection 58 between the modular subassemblies may be accomplished by direct butt-welding of the pipe sections, by use of bolted flange connections, or by use of Marmon clamps. These connections provide full pipe wall strength to the assembled riser configuration.

With a DOR transport vehicle 10 and a DOR quad riser assembly 46 constructed as described above, the objectives of the invention for relocating sediment or other waste materials to an abyssal site can be achieved. Of course, DOR transport vehicle 12 can be employed without the DOR quad riser assembly 46 (as, for example, in the embodiment described above wherein the DOR transport vehicle 10 itself descends to the ocean floor to deposit waste), and DOR quad riser assembly 46 can be employed with another suitable transport vehicle.

Although particular embodiments have been described, various modifications will become apparent to one of ordinary skill in the art upon reading and understanding the foregoing description. All such modifications that basically rely upon the teachings through which the present invention has advanced the state of the art are properly considered within the spirit and scope of the invention.

We claim:

1. An seamersible vehicle of large bulk cargo capacity for transporting waste, comprising:
   a free floodable, positively buoyant submersible space-frame matrix including a plurality of storage cells for storing waste;
   side fairing and ballast tanks secured on opposing sides of said space-frame matrix;
   forward and aft trim tanks secured on port and starboard sides, respectively, of said space-frame matrix;
   forward and aft fairings fixed to forward and aft ends of said space-frame matrix;
   at least one rudder operably mounted to said aft fairing for changing yaw direction of the vehicle;
   horizontal stabilizers mounted to said side fairings for changing pitch and roll attitudes of said vehicle;
   a control system operably connected with said trim tanks, said at least one rudder and said stabilizers for controlling yaw, pitch and roll attitudes through a combination of changing the volume of said trim tanks and angles of control surfaces of said at least one rudder and said stabilizers for controlling speed, direction and depth of travel of said vehicle in sea water; and
   said space-frame matrix being capable of withstanding pressures existing at abyssal depths and being positively buoyant in sea water when the storage cells are empty.

2. A vehicle according to claim 1, wherein said space-frame matrix comprises a plurality of tubular members having a material density of less than 0.1 lbs/cu.in. and having internal voids that are filled with a buoyant material having a density of approximately 0.02 lbs/cu.in. or less.

3. A vehicle according to claim 2, wherein said tubular members are of at least partially hollow construction to provide said voids and said voids are filled with syntactic foam as said buoyant material.

4. A vehicle according to claim 2, wherein said tubular members are hollow structural members made of aluminum and filled with syntactic foam.

5. A vehicle according to claim 1, wherein said frame structure comprises a plurality of frame sections including a first plurality of horizontal frame sections joined by vertex elements at right angles to a second plurality of horizontal frame sections.

6. A vehicle according to claim 5, wherein each of said storage cells comprises a wall separating adjacent storage cells, each said wall being fixed to one of said horizontal frame sections, and having a predetermined taper that opens downwardly.

7. A vehicle according to claim 1, further comprising upper and lower doors for admitting and discharging waste material to and from said storage cells, respectively, said upper and lower doors being controlled by said control system to open synchronously when waste material is discharged from said storage cells.

8. A vehicle according to claim 7, wherein said control system controls said upper and lower doors to open synchronously from a vehicle longitudinal centerline, sequentially outward to the port and starboard rows respectively of said space-frame matrix when discharging waste from said storage cells so that the vehicle is stable during the discharging.

9. A vehicle according to claim 1, wherein said control system controls said first and second ballast tanks to take in water in a sufficient amount to cause the vehicle to descend and further controls said stabilizers, said trim tanks and said at least one rudder to cause the vehicle to travel along a helical glide path to abyssal depths at a disposal site.

10. A vehicle according to claim 9, wherein said control system further controls said stabilizers, said trim tanks and said at least one rudder to cause the vehicle to ascend and travel along a helical glide path from abyssal depths after discharging waste from said storage cells.

11. A vehicle according to claim 1, wherein said vehicle structure weight is less than 15% of the bulk cargo capacity.

12. A vehicle according to claim 11, further comprising a towline connection at the bow of the vehicle and a bulk cargo capacity of 50,000 tons, wherein said space-frame and fairings are dimensioned to provide less than 100,000 lb. net towline drag resistance at 7.5 knots forward speed under tow by a host vehicle and requiring less than 2,000 hp net towing power.

13. A vehicle according to claim 1, wherein said fairings are prolate spheroidal in shape having an outer shell of a material with a density of less than 0.1 lbs/cu.in. and having an inner volume that is at least partially filled with a buoyant material having a density of approximately 0.02 lbs/cu.in. or less.

14. A vehicle according to claim 13, wherein said material of said outer shell is aluminum and said inner volume is filled with syntactic foam.

15. A vehicle according to claim 6, further comprising a disposable liner for holding waste disposed in each of said storage cells.

16. A riser assembly for conveying waste to a discharge region at abyssal depths of an ocean, comprising:
a floating or semi-submersible platform;
said riser being secured to said platform and extending from said platform to the abyssal discharge region and being comprised of a plurality of sections having at least four pipes spaced apart for generating a high mass moment of inertia for the riser:
at least one spacer structure in each said section joined to said pipes for spacing said pipes apart;
power and data transmission elements extending the length of said riser; and
said riser assembly being neutrally buoyant in sea water with a specific gravity of 0.97; and
habituation means for drawing water up from abyssal depths via at least one of said pipes, for mixing the water brought up with waste to create a slurry, and for discharging the first slurry at abyssal depths via others of said pipes.

17. A riser assembly according to claim 16, wherein said habituation means further draws water up from abyssal depths via said two of said pipes, mixes the water drawn up with waste to create a slurry, and discharges the slurry at abyssal depths via another two of said pipes.

18. A riser assembly according to claim 16, wherein the habituation means creates the slurry to be 20 to 80 percent waste by weight.

19. A riser assembly according to claim 18, wherein the habituation means creates the slurry to be 20 to 30 percent waste by weight.

20. A riser assembly according to claim 16, wherein the habituation means discharges the slurry via the others of said pipes at a discharge velocity of less than ten feet per second at abyssal depths.

21. A riser assembly according to claim 20, wherein the habituation means discharges the slurry via the others of said pipes at a discharge velocity of less than five feet per second at abyssal depths.

22. A riser assembly according to claim 16, wherein each of the pipes has a diameter between 24 and 36 inches.

23. A riser assembly according to claim 16, wherein the spacer structure is large enough to support an operation for assembly of the sections.

24. A riser assembly according to claim 16, further comprising clamps for coupling said sections together.

* * * * *